(12) United States Patent
Hilde

(10) Patent No.: US 7,561,261 B2
(45) Date of Patent: Jul. 14, 2009

(54) LADAR STREAM FORMATTING AND PROCESSING METHOD

(75) Inventor: Jeffrey J. Hilde, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 86 days.

(21) Appl. No.: 11/944,997

(22) Filed: Nov. 26, 2007

(65) Prior Publication Data

US 2008/0252874 A1   Oct. 16, 2008

Related U.S. Application Data

(63) Continuation-in-part of application No. 11/926,252, filed on Oct. 29, 2007, which is a continuation-in-part of application No. 11/787,343, filed on Apr. 12, 2007, now abandoned.

(51) Int. Cl.
*G01C 1/06* (2006.01)
(52) U.S. Cl. .................................. 356/139; 356/141.1
(58) Field of Classification Search ................. 356/139, 356/141.5
See application file for complete search history.

(56) References Cited

U.S. PATENT DOCUMENTS

2006/0227316 A1* 10/2006 Gatt .......................... 356/5.09

\* cited by examiner

*Primary Examiner*—Thomas H Tarcza
*Assistant Examiner*—Timothy A Brainard
(74) *Attorney, Agent, or Firm*—David S. Kalmbaugh

(57) ABSTRACT

A Lasar Stream format is provided which is a logical structure that encapsulates Ladar sensor data generated by a Ladar sensor. The data is packaged into message structures for transmission over a transport medium. The messages form a data stream and when the messages arrive at a destination the messages are processed and made available for use by signal processors such as automatic target recognition system.

19 Claims, 5 Drawing Sheets

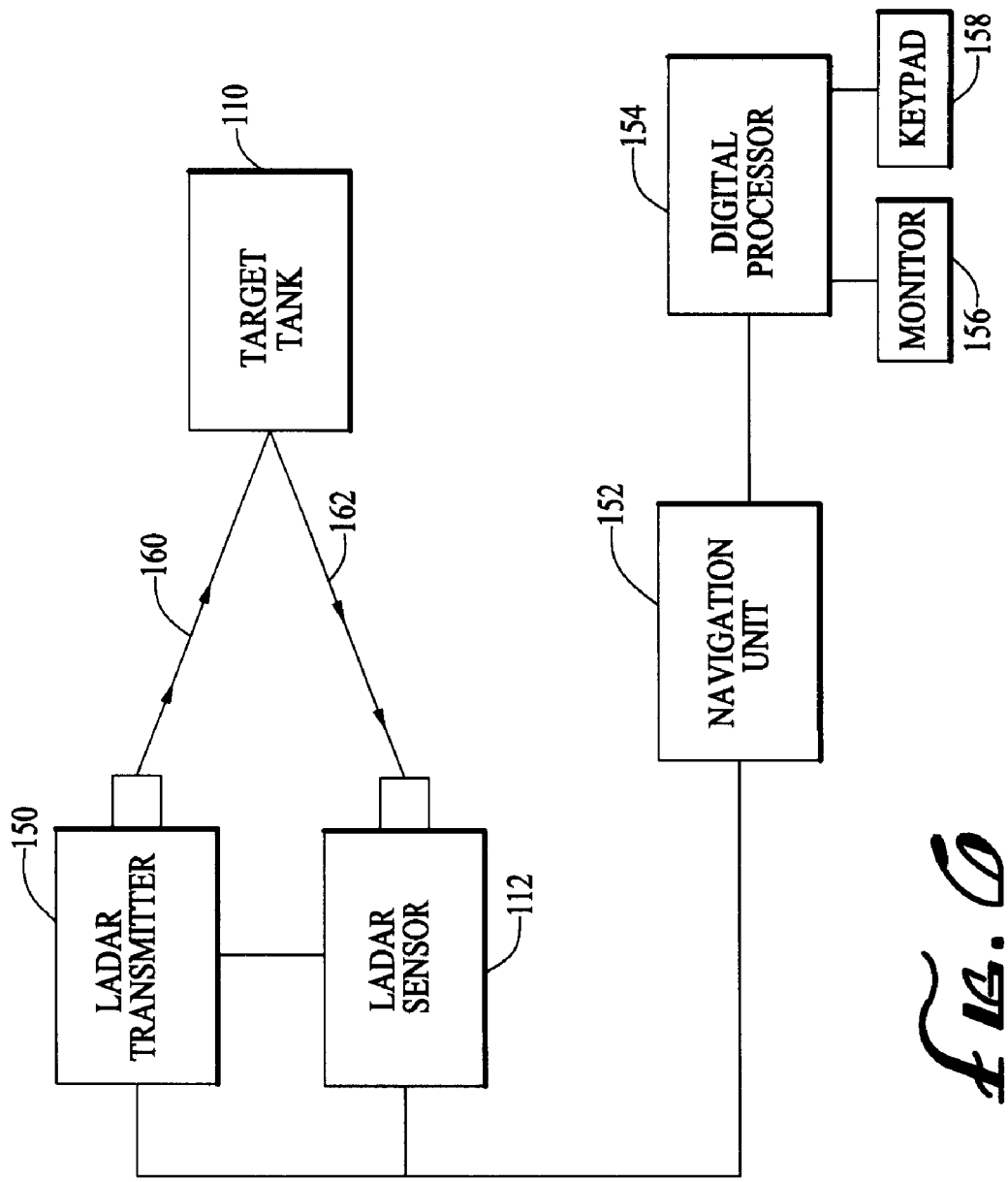

LADAR STREAM FORMATTING AND PROCESSING METHOD

The application is a continuation-in-part of U.S. patent application Ser. No. 11/926,252, filed Oct. 29, 2007, which is a continuation-in-part of U.S. patent application Ser. No. 11/787,343, filed Apr. 12, 2007 now abandoned.

BACKGROUND OF THE INVENTION

1. Field of the Invention

The present invention relates generally to Ladar data processing. More particularly, the present invention relates to a Ladar stream format and an algorithm which provides for the efficient processing of the Ladar data stream.

2. Description of the Prior Art

Ladar data is a unique type of imagery data with many different element types that need to come together to properly represent the data. These Ladar element types of data include range data, Ladar sensor x,y,z location and Ladar sensor yaw, pitch and roll. In the past this Ladar data has been very difficult to work with because too many assumptions were required to interpret and process the Ladar data.

In addition, the Ladar data was inconsistent in how it concisely represented the geometry of a target or other object of interest, which varied with each different type of Ladar sensor. Further, the Ladar data generally takes up to much space, which results in increased costs for higher bandwidth data transmission links and more storage space in computer memory.

It is also very difficult to verify the Ladar sensor's correct functioning and output using currently available Ladar data formats.

Accordingly, there is a need for a Ladar Stream Format which allows for efficient data transmission and storage and also efficient, effective and concise processing of Ladar data.

SUMMARY OF THE INVENTION

The Ladar Stream Format and efficient and concise data processing method comprising the present invention provides a unique solution to problems of the past including those mentioned above. The present invention defines a Ladar data representation that is very concise and very efficient to process. Further this Ladar data representation is very general which makes it well suited for multiple processing applications and makes few assumptions about the architecture of a Ladar sensor and is therefore very useful to all Ladar sensor designs.

The present invention includes the Ladar Stream format and an algorithm for its efficient processing. The Lasar Stream format is a logical structure that encapsulates Ladar sensor data generated by a Ladar sensor. The data is packaged into message structures for transmission over a transport medium. These messages form a data stream and when the messages arrive at a destination the messages are processed and rendered/made available for use by signal processors such as automatic target recognition system.

Efficient Processing of the Ladar sensor data is performed in two major steps. The first step provides for a three dimensional rotation and translation applied to direction vectors for each of a plurality of Ladar/laser beams sensed by the Ladar sensor using the algorithm. During the second step the results are ordered into a regular grid which represents an image with five planes containing range, intensity and x, y and z coordinates of three dimensional position for each pixel in the image.

There are three messages in a Ladar Flash stream. The sequential stream order of these messages is first the Ladar Sensor Message, which is provided once and first for the Ladar sensor. Thereafter, for each scan a Ladar Scan Message is provided and then multiple Ladar Flash Messages are given for all the data that makes up the scan of the previous Ladar Scan Message.

BRIEF DESCRIPTION OF THE DRAWINGS

FIG. 6 illustrates a block diagram of the Ladar system used to scan the target tank illustrated in FIG. 5 and generate the X,Y,Z points for the target tank.

DETAILED DESCRIPTION OF A PREFERRED EMBODIMENT

Figure 1:
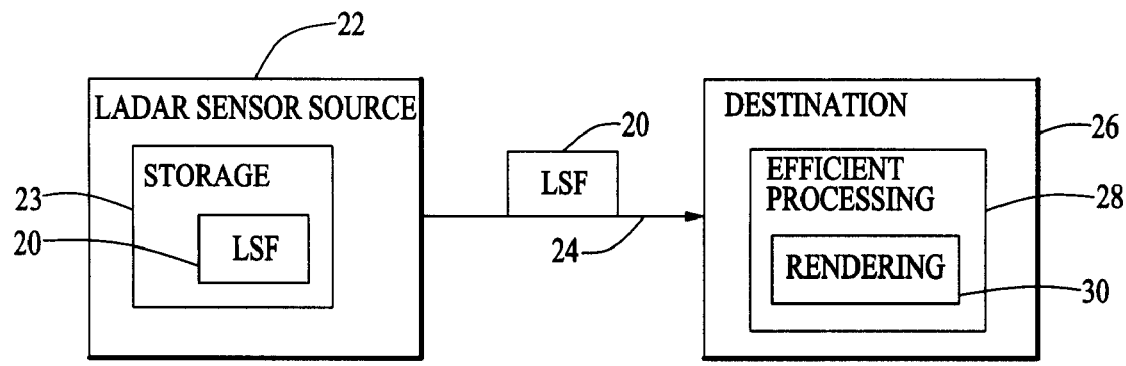
FIG. 1 is a simplified block diagram of a system which the Ladar Stream Format of the present invention to transfer and store Ladar data.
Figure 2:
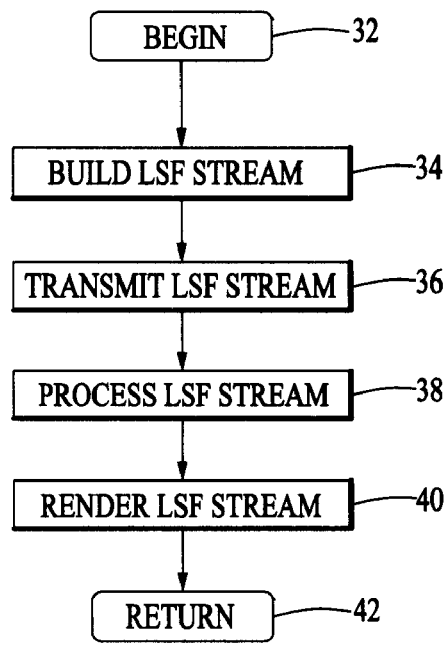
FIG. 2 is a simplified flow chart which illustrates the process for building, transferring and processing of the Ladar Stream Format.

Referring to FIGS. 1 and 2, the present invention comprises a Ladar stream format 20 and an algorithm for the efficient processing of the Ladar stream format 20. This format is a logical structure that encapsulates Ladar sensor data provided from storage/memory 23 within a Ladar sensor source 22. The Ladar data is packaged into message structures (step 34, FIG. 2) for transmission over a transport medium 24 (step 36, FIG. 36). These messages form a Ladar data stream and when the messages arrive at a destination 26 the messages will be processed by efficient processing 28 (step 38, FIG. 2) and the Ladar stream is rendered (block 30, FIG. 1) by signal processors such as automatic target recognition and/or displayed for viewing (program step 40, FIG. 2).

Figure 4:
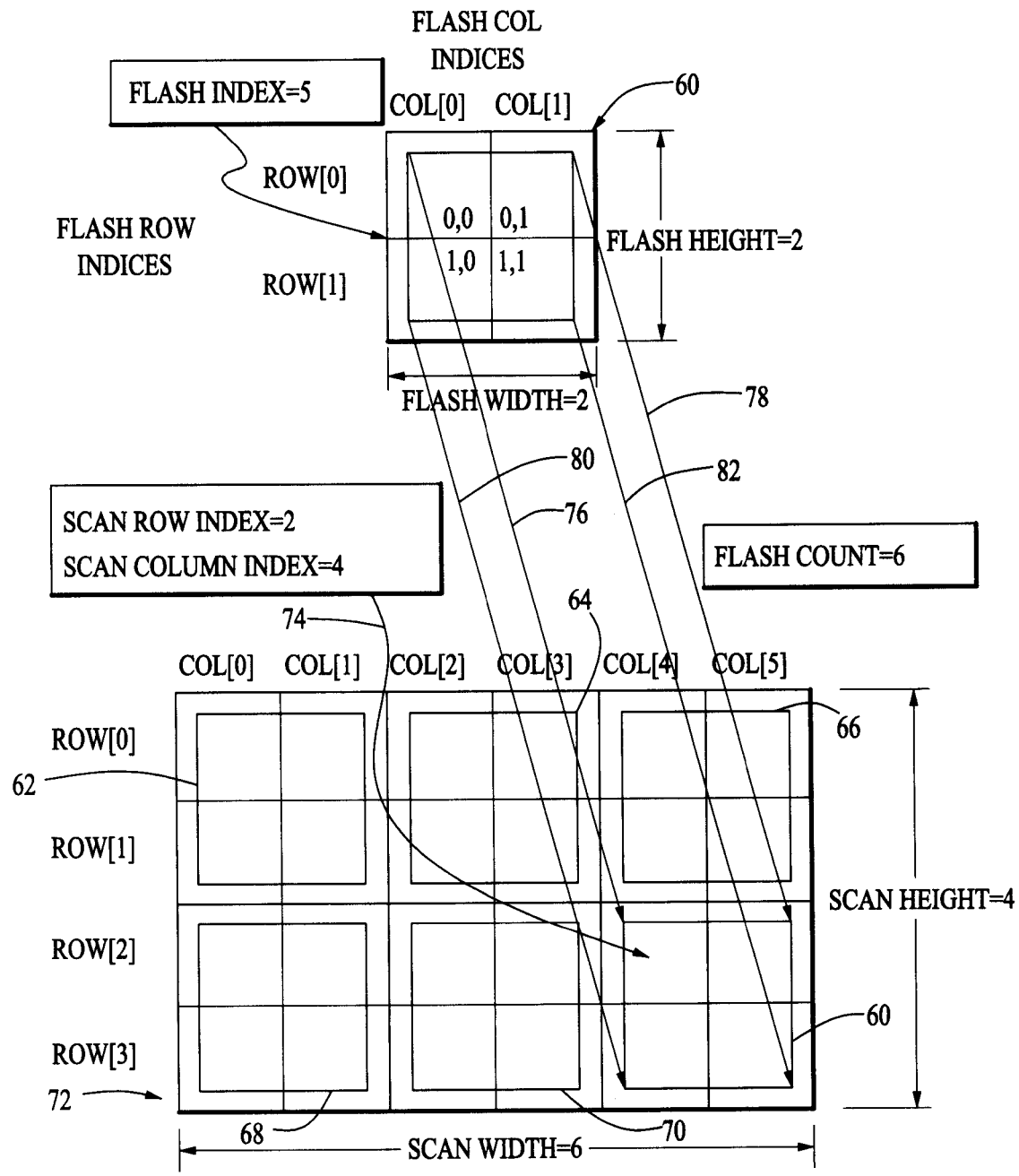
FIG. 4 illustrates a mapping process for a simple example of flash to scan mapping.

The steps to be preformed in FIG. 1 are as follows: first, the Ladar sensor 22 outputs Ladar data in the Ladar Stream Format 20; second the Ladar Stream Format 20 is transported to a destination 26 where the processing described in equations set forth below is performed. The Ladar data is then made available for signal processing 28 or rendering 30. The flow chart of FIG. 2, which includes steps 32-42 illustrates the process for building, transferring and processing of the Ladar Stream Format Efficient processing (block 28) of Ladar data is performed in two major steps. First, a three dimensional rotation and translation is applied to direction vectors for each Ladar/laser beam 114, 118, 122, 126, 130, 134, 138, 142 and 146 (FIG. 5) detected by the Ladar sensor source 22. Second, the results are ordered (as shown in FIG. 4) into a regular grid that represents an image with five planes containing range, intensity and x, y and z coordinates of a three dimensional position for each pixel in an image of a target or other object of interest. This allows for very efficient processing of Ladar data.

Figure 3:
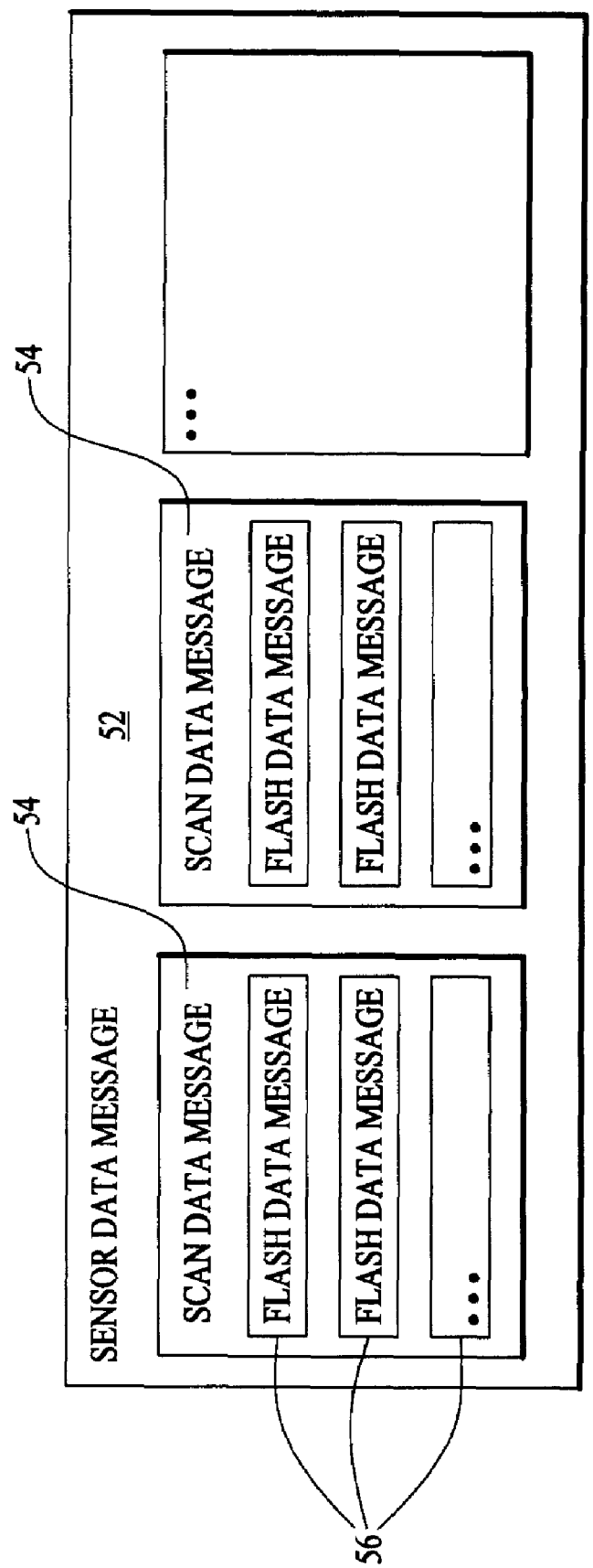
FIG. 3 illustrates the informational hierarchy of the three messages comprising the Ladar Stream Format.

Referring to FIG. 3, there are three messages in a LSF (Ladar Stream Format) stream of Ladar data. The sequential stream order of three messages are a Ladar Sensor Message 52, which is provided once and first for the Ladar sensor 22. Thereafter, for each scan by Ladar sensor 22, a Ladar Scan Message 54 is provided and then multiple Ladar Flash Messages 56 are provided for all the data that makes up the scan of the previous Ladar Scan Message 54. The informational hierarchy of these messages are illustrated in FIG. 3. All the data identified inside the Sensor Data Message box will be processed using the data given in that Sensor Data Message 52 and all the data identified inside a Scan Data Message box will be processed using the data given in that Scan Data Message 54.

TABLE I

Message Header

| Item | Format | Units | Description |
|---|---|---|---|
| Start Code | UI 32 | N/A | Hex pattern 0xABCDC0DE |
| Message ID | UI 32 | N/A | Numeric code identifying message type 0x00010101 Sensor Data Message 0x00010201 Scan Data Message 0x00010301 Flash Data Message |
| Index | UI 32 | N/A | Sequential index number that starts at 0 for each message type and increments with each subsequent message of the same type. |
| Word Count | UI 12 | words | Number of remaining words following this header block, including the final message checksum word. The value of Word Count is important to reader implementations as it indicates the reader version required. If the value of Word Count is unexpected then the reader must fail to read content. |
| | | | Message Body located here |
| Checksun | UI 12 | N/A | To check for message data corruption. Must be zero if invalid. |

The following table defines the format codes for Table I as well as Tables III, IV and V, which are discussed below.

TABLE II

Field Formats

| Format | Signed | Size(Bits) | Type | Standard |
|---|---|---|---|---|
| UI 16 | No | 16 | integer | little-endian |
| UI 32 | No | 32 | integer | little-endian |
| UI 64 | No | 64 | integer | little-endian |
| I 32 | Yes | 32 | integer | little-endian twos-complement |
| R 32 | Yes | 32 | floating-point | little-endian, IEE-754 |

The following table describes the body of a Ladar Sensor Message 52 of FIG. 3:

TABLE III

Ladar Sensor Message

| Item | Format | Units | Description |
|---|---|---|---|
| Scan Word Count | UI 32 | words | Same value as the Word Count header field for all Scan messages. |
| Flash Word Count | UI 32 | words | Same value as the Word Count header field for all Flash messages. |
| Field Group | UI 32 | flags | This field defines bit flags which determine whether a group of related fields are present or not. |
| Reserved | Bits 0-28 | flags | These flags are reserved for future use. |

TABLE III-continued

Ladar Sensor Message

| Item | Format | Units | Description |
|---|---|---|---|
| Sampling | Bit 30 | flag | This bit, if set, turns on the Sampling Field Group which include the Pixel Sample Count field of the Sensor message, and the Sample Rate, First Sample Range, and Samples fields of the Flash message. These fields will be present if this bit is set and not present if it is not set. |
| Marker | Bit 31 | flag | This bit must always be 1. This helps to distinguish between files that were created before this field was defined and those after. |
| Intensity Max | R 32 | N/A | Maximum intensity value of the Ladar Flash Messages. |
| Flash Pixel Count | UI 32 | count | Number of pixels, (i) in Ladar Flash Message. |
| Max Flash Count | UI 32 | Count | The maximum flash count of any following Scan. This allows readers/processors to allocate sufficient memory for Flash messages up front. Processors may skip processing of Flash messages in excess of this count. |
| View Port Width | UI 16 | pixels | These fields define a rectangular region view port for viewing and processing the Flash data. Any data falling outside this region may not be seen or processed. Thus the View Port Width and Height should be the maximum pixel width and height of any following Scan, but in any case these fields allow readers/processors to setup an image buffer up front. |
| View Port Left | UI 16 | pixels | |
| View Port Height | UI 16 | pixels | |
| View Port Top | UI 16 | pixels | |
| Pulse Repetition Frequency | R 32 | Hz | The Flash Message rate per second. This allows computation of data bit rates which are needed to allocate computer resources up front. |
| Pixel Sample Count | UI 32 | count | The number of samples (j) of the returning laser wave form per pixel in the Samples array of the Flash message. |
| | Future Field Groups Must Be Added Here. | | |
| Flash Direction VectorsX | Array(i) of R 32 | N/A | The center beam will have a direction vector of (1, 0, 0) and the remaining unit length direction vectors will be with respect to this beam in the DFFPA coordinate frame. These vectors in combination with the range, position and rotation matrix of the Ladar Flash Message will determine the xyz point for each beam. Order will be the same as in the Range and Intensity data of the Ladar Flash Message for all the X coordinates, then all the Y's and then all the Z's. |
| Flash Direction VectorsY | Array(i) of R 32 | N/A | |
| Flash Direction VectorsZ | Array(i) of R 32 | N/A | |
| Flash Row Indices | Array(i) of UI 32 | N/A | This array maps each beam to a row within a Ladar Flash. Order will be the same as in the Range and Intensity data of the Ladar Flash. For example for a flash that is 2 pixels wide and 2 pixels high, this array would look like this {0, 1, 0, 1} if given in top to bottom then left to right order. |
| Flash Column Indices | Array(i) of UI 32 | N/A | This array maps each beam to a column within a Ladar flash. Order will be the same as in the Range and Intensity data of the Ladar Flash Message. For example for a flash that is 2 pixels wide and 2 pixels high, this array would look like this {0, 0, 1, 1} if given in top to bottom then left to right order. |

The following table describes the body of a Ladar Scan Message 54 of FIG. 3:

TABLE IV

Ladar Scan Message

| Item | Format | Units | Description |
|---|---|---|---|
| Sensor Message Index | UI 32 | index | This points to the Ladar Sensor message for which this message is relative to. |
| Reserved | UI 32 | N/A | This should be set to zero and ignored by readers. |
| Flash Count | UI 32 | count | Total number of Ladar Flash Messages in this scan. |
| Scan Width | UI 16 | pixels | These 4 fields define a rectangular image region for the flash data of this Scan. This allows viewers and processors to focus resources on this region should it be significantly smaller than the View Port that was setup in the Sensor message thus saving compute power. |
| Scan Left | UI 16 | pixels | |
| Scan Height | UI 16 | pixels | |
| Scan Top | UI 16 | pixels | |
| Future Field Groups Must Be Added Here. | | | |

The following table describes the body of a Ladar Flash Message 56 of FIG. 3:

TABLE V

Ladar Flash Message

| Item | Format | Units | Description |
|---|---|---|---|
| Scan Message Index | UI 32 | index | This points to the Ladar Scan Message for which this message is relative to. |
| Time | UI 64 | 100-nsec | System time of the data in this message. |
| Position X | R 32 | meters | Position of the sensor within the Earth Fixed Locally Level (EFLL) coordinate frame and is valid at the time of this message. |
| Position X | R 32 | meters | |
| Position Z | R 32 | meters | |
| $T_{11}$ | R 32 | N/A | Rotation matrix that transforms the Flash Direction Vectors of the Ladar Sensor Message into the EFLL coordinate frame using Equation (1) and is valid at the time of this message. |
| $T_{12}$ | R 32 | N/A | |
| $T_{13}$ | R 32 | N/A | |
| $T_{21}$ | R 32 | N/A | |
| $T_{22}$ | R 32 | N/A | |
| $T_{23}$ | R 32 | N/A | |
| $T_{31}$ | R 32 | N/A | |
| $T_{32}$ | R 32 | N/A | |
| $T_{33}$ | R 32 | N/A | |
| Scan Row Index | I 32 | index | This index gives the image row which after using the Flash Row Column Indices as offsets will give the rows of the pixels that are in this Ladar Flash Message. |
| Scan Column Index | I 32 | index | This index gives the image column which after using the Flash Row Column Indices as offsets will give the columns of the pixels that are in this Ladar Flash Message. |
| Flash Pixel Count | UI 32 | count | Number of pixels (i) in range and intensity data array. This field is redundant with the Flash Pixel Count field of the Sensor message. |
| Sample Rate | R 32 | Hz | The sample rate (samples per second) for the data in the Samples array. |
| Future Field Groups Must Be Added Here. | | | |
| First Sample Range | Array[i] of R 32 | meters | The range to the first sample for each pixel in the Samples array. |
| Samples | Array[i * j] of R 32 | N/A | Sampled laser wave form where the number of samples j for each pixel is defined by the Pixel Sample Count field in the Sensor Message. All the samples for one pixel are together and in time order. |
| Range | Array[i] of R 32 | meters | Distance from the sensor to the scene for each beam in this flash message. |
| Intensity | Array[i] of R 32 | N/A | Intensity of pixels where the scale is arbitrary and constant but the bias or offset is zero. |

The Sensor Message of Table III contains flash direction vectors for all laser beams 114, 118, 122, 126, 130, 134, 138, 142 and 146 (FIG. 5) in a coordinate frame fixed to the detector focal plane array, which is a Detector Fixed Focal Plane Array (DFFPA) frame. The DFFPA frame and all the flash direction vectors are defined in the following manner.

The detector array is a collection of pixels, each of which is a member of one row and one column. These detector arrays are in a grid of rows and columns, where every row has a pixel that is a member of every column and every column has a pixel that is a member of every row.

Figure 5:
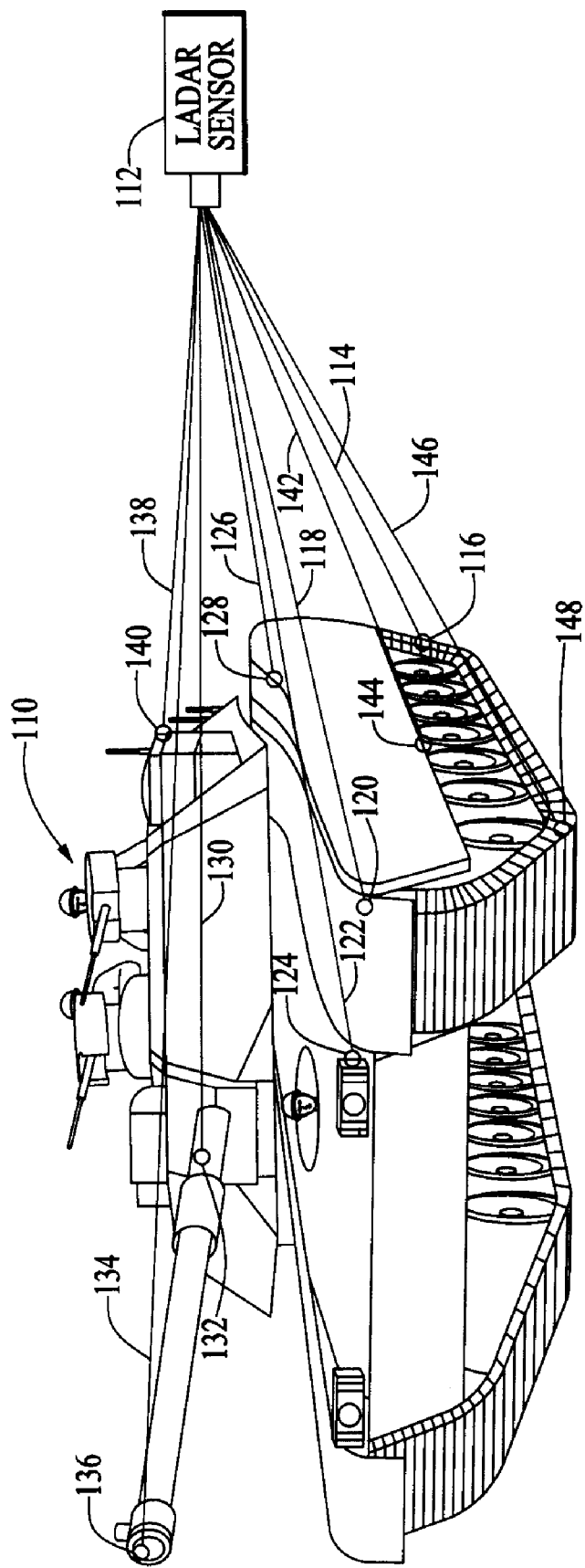
FIG. 5 illustrates a Ladar scan of a target which is used to generate the X,Y,Z points for a target which as depicted is a tank.

A detector fixed focal plane array coordinate system (DFFPA coordinate system frame) has its origin at the detector focal plane array. Each pixel has a unit length direction vector that points from the origin of the DFFPA coordinate system to the place of it's reflection off of the scene or target tank 110 (FIG. 5). All of the Pixel vectors of the same row lie in a plane, and all the Pixel vectors of the same column lie in a plane. All the row planes intersect in the y-axis of the DFFPA coordinate system and all the column planes intersect in the z-axis of the DFFPA coordinate system. Each row plane is angularly spaced from the next row plane by a vertical resolution and each column plane is angularly spaced from the next column plane by a horizontal resolution. The pixel vector that is a member of the center row and center column lies in the x-axis which is perpendicular to the y and z axes and it has a direction vector of (1, 0, 0).

Therefore, a specification of the number of rows and columns in the detector array, and the specification of the vertical resolution and the horizontal resolution defines all of the pixel vectors, their row and column planes and the DFFPA coordinate system in which the pixel vectors lie. These pixel vectors are the Flash Direction Vectors of the Ladar Sensor Message.

Each Ladar Flash Message 52 (see Table V) contains data to transform the Flash Direction Vectors into an earth fixed locally level navigation coordinate frame, that is the Earth Fixed Locally Level (EFLL) coordinate frame. Computing the transform as shown in Equation one, below, will transform the xyz components of the Flash Direction Vectors expressed in the Detector Fixed Focal Plane Array (DFFPA) frame to X,Y,Z components expressed in the EFLL frame. For example, if x, y and z are the components of a vector expressed in the focal plane array fixed frame, X, Y and Z will be the components of the same vector expressed in the EFLL frame. This allows for the computation of the EFLL frame xyz point for each laser beam 114, 118, 122, 126, 130, 134, 138, 142 and 146 (FIG. 5) in the Ladar Flash Message and thus for each pixel in the Ladar scan image. The computations are made as set forth in the equation follows:

$$\begin{bmatrix} X \\ Y \\ Z \end{bmatrix} = \begin{bmatrix} T11 & T12 & T13 \\ T21 & T22 & T23 \\ T31 & T32 & T33 \end{bmatrix} \times \begin{bmatrix} x \\ y \\ z \end{bmatrix} \times \text{Range} + \begin{bmatrix} PositionX \\ PositionY \\ PositionZ \end{bmatrix} \quad (1)$$

where X,Y,Z are the coordinates for each pixel point on the surface of target 110 as measured by LADAR sensor 112. These coordinates are expressed as an Earth Fixed Locally Level (EFLL) Coordinate Frame.

The X,Y,Z coordinate position for each pixel point on the surface of target 110 as measured by LADAR sensor 112 are identified by the following reference numerals 116, 120, 124, 128, 132, 136, 144 and 148.

The matrix within equation (4), which contains the elements T11, T12, T13, T21, T22, T23, T31, T32 and T33, is a three dimensional rotation matrix. The matrix containing the vector elements x,y,z in equation (1) represents the x,y,z components of the direction vector for each pixel point on the target's surface. Data contained in the rotation matrix, the direction vector matrix, the range measurement, and the sensor position matrix of equation (1) is supplied by the Ladar sensor 112 to the navigation unit 152 in a Ladar Flash Message Format.

Referring to FIGS. 5 and 6, a LADAR transmitter 150 transmits a Laser beam 114, 118, 122, 126, 130, 134, 138, 142 and 146 (FIG. 5) which is directed along a light path 160 to the surface of a target 110. The reflection of the Laser beam 114, 118, 122, 126, 130, 134, 138, 142 or 146 (FIG. 5) from the surface of target 110 is directed along a light path 162 to a LADAR sensor 112. The LADAR transmitter 150 scans the entire surface of the target 110 with the laser beams 114, 118, 122, 126, 130, 134, 138, 142 and 146 (FIG. 5) and the LADAR sensor 112 senses or detects each X,Y,Z coordinate point 116, 120, 124, 128, 132, 136, 144 and 148 generated by the reflection of the laser beam 114, 118, 122, 126, 130, 134, 138, 142 or 146 (FIG. 5) from the surface of target 110. The navigation unit 152 processes the messages received from LADAR sensor 112 to generate the X,Y,Z coordinates for each coordinate point 116, 120, 124, 128, 132, 136, 144 and 148 on target 110.

In equation (1), T11, T12, T13, T21, T22, T23, T31, T32 and T33 are elements of Rotation matrix that transforms the Flash Direction Vectors of the Ladar Sensor Message into the EFLL coordinate frame. The matrix containing the elements PositionX, PositionY, PositionZ defines the location for the Ladar sensor 112 within the EFLL coordinate frame and has units of meters. Range in equation (1) is measured by the Ladar sensor 112. Range is the distance from the Ladar sensor 112 to the scene or target 110 for each Ladar/laser beam 114, 118, 122, 126, 130, 134, 138, 142 and 146 (FIG. 5) in the flash message. Range also has units of meters.

The Flash Sensor Message includes Flash Direction Vectors x, y, z which form the single column xyz matrix of equation (1). It should be noted that the center Ladar beam always have a direction vector of (1, 0, 0) and the remaining unit length direction vectors are with respect to this beam in the Detector Fixed Focal Plane Array (DFFPA) coordinate frame. These direction vectors in combination with the range, position and rotation matrix of the Ladar Flash Message determine the xyz coordinate point 116, 120, 124, 128, 132, 136, 144 and 148 on target 110 for each Ladar beam 114, 118, 122, 126, 130, 134, 138, 142 and 146 (FIG. 5).

The second and last step of the Efficient Processing of Ladar sensor data is to process the Flash Range and Flash Intensity data and also the X,Y,Z coordinate data calculated using equation one into a scan image array. The scan image array contains five image planes: Range and Intensity, and X, Y and Z, expressed in the EFLL coordinate system frame.

Referring to FIG. 4, FIG. 4 illustrates how to use the data in the messages to perform the last step of Ladar data processing, which maps pixel data into an image array, for a relatively simple example. Refer to the message format tables (see Tables 2-4 below) for the Ladar messages to find the fields shown in FIG. 4. These messages accommodate different Ladar sensors and yet remain concise and efficient in representing the data and allow for efficient processing of Ladar data into image arrays containing three-dimensional position information for each pixel.

FIG. 4 gives a picture of the mapping process for a simple example, but the following defines the mapping process for the present invention. The inputs are Ladar Flash arrays of the type illustrated by array 60 of FIG. 4. The outputs are Ladar scan arrays of the type illustrated by array 60 of FIG. 4.

Inputs:

Range and Intensity arrays from the Flash messages and X, Y and Z arrays computed from Equation 1.

Outputs:

RangeImage, IntensityImage, XImage, YImage and ZImage image arrays.

```
For each Ladar Flash Message do the following:
{
    Let: PixelIndex = 0;
    For each Pixel in the Ladar Flash Message do the
    following:
    {
        Compute: Row = ScanRowIndex +
                        FlashRowIndices[PixelIndex];
        Compute: Column = ScanColumnIndex +
                        FlashColumnIndices[PixelIndex];
        Let: RangeImage[Row, Column] = Range[PixelIndex];
        Let: IntensityImage[Row, Column] =
                        Intensity[PixelIndex];
        Let: XImage[Row, Column] = X[PixelIndex];
        Let: YImage[Row, Column] = Y[PixelIndex];
        Let: ZImage[Row, Column] = Z[PixelIndex];
        Compute: PixelIndex = PixelIndex + 1;
    }
}
```

In the data example of FIG. 4, the Flash Index is five, and the Flash Count is six for the pixels of Ladar Flash array 60. The Flash Index is a sequential index number that starts at 0 for each message and increments with each subsequent message. The Flash count is the total number of Ladar Flash Messages in the scan as shown in FIG. 4. Six Ladar Flash arrays 60, 62, 64, 66, 68 and 70 are mapped to the scan image 72 which has a Scan width of six and a Scan height of four.

For the example of FIG. 4, the Flash Row Indices is an array which maps each beam to a row within a Ladar Flash Message. The order is the same as in the Range and Intensity data of the Ladar Flash Message. The Flash data shown in FIG. 4 is 2 pixels wide and 2 pixels high, and the Flash row array looks like the following 0,1,0,1, from top to bottom and then left to right. The Flash Column Indices is an array which maps each beam to a column within a Ladar Flash Message. Again, the order is the same as in the Range and Intensity data of the Ladar Flash Message. The Flash data shown in FIG. 4 is 2 pixels wide and 2 pixels high, and the Flash column array looks like the following 0,0,1,1, from top to bottom and then left to right.

For a Scan Row Index equal to two and a Scan Column Index equal to four, "0,0" within Flash array 60 points to row[2], column[4] of the scan image array 72 (as indicated by arrows 74 and 76). For a Scan Row Index equal to two and a Scan Column Index equal to four, "0,1" within Flash array 60 points to row[2], column[5] of the scan image array 72 (as indicated by arrows 78). For a Scan Row Index equal to two and a Scan Column Index equal to four, "1,0" within Flash array 60 points to row[2], column[5] of the scan image array 72 (as indicated by arrow 80). For a Scan Row Index equal to two and a Scan Column Index equal to four, "1,1" within Flash array 60 points to row[3], column[5] of the scan image array 72 (as indicated by arrows 82).

Digital processor 154 calculates the xyz coordinate point 116, 120, 124, 128, 132, 136, 144 and 148 on target 110 for each Ladar beam 114, 118, 122, 126, 130, 134, 138, 142 and 146 using equation one. The digital processor 154 can also be programmed to perform the mapping operation illustrated in FIG. 4. Connected to the digital processor 154 are a monitor 156 and keypad 158. The scan image containing the five image planes, Range and Intensity, and X, Y and Z, expressed in the EFLL coordinate system frame can be viewed on monitor 156. Keypad 158 allows the user to enter data in to digital processor 158.

In the future if it is desired to change Ladar Stream Format, the format must be done in the following manner. The only changes allowed are an addition of fields. The added fields are defined as a Field Group and a bit flag is added to the Field Group field to indicate the presence of the new fields.

The location of the fields which are added is always after the fixed length portion of the messages and before the variable length portion of the messages to enable readers to skip any unknown Field Groups. This provides users access to all the non-variable length data of all Field Groups which allows users to make decisions on which Field Groups to support with limited resources. Otherwise there is no way to know the demands of a Field Group until resources have already been committed to another Field Group.

There would be a problem if the priority of the Field Groups (as selected by a user or by some other means) was in the opposite order as the occurrence of the Field Groups in the stream. Users are allowed to skip directly to the data they are interested in without going through several parsing-skipping cycles. Versioning the Ladar data stream in this manner results in writers and files that will never go out of spec and readers that can always process the known portion of the data efficiently.

Ladar data is identified and formatted into the Ladar Stream Format (LSF) of Tables I-V and then transformed and mapped into images by the Efficient Processing of Equation one and FIG. 4. The Ladar data representation used in the present invention is very concise and very efficient to process. It is also very general and makes few assumptions about the architecture of the Ladar sensor and is therefore extremely useful and adaptable to all Ladar sensor designs.

The computer program listing used in digital processor 154 is set forth as follows:

Program Listing for Digital Processor 154

```
// Example counts and sizing
#define PIXEL_SAMPLE_COUNT 3
#define FLASH_PIXEL_COUNT 4
#define FLASH_COUNT 6
#define SCAN_COUNT 1
#define SCAN_WIDTH 6
#define SCAN_HEIGHT 4
// this structure holds the data from a LSF (Ladar Stream Format) Ladar Sensor
Message
struct SensorMessageTag
{
    int StartCode;
    int MessageID;
    int Index;
    int WordCount;
    int ScanWordCount;
    int FlashWordCount;
    int FieldGroups;
    float IntensityMax;
    int FlashPixelCount;
    int MaxFlashCount;
    short ViewPortWidth;
    short ViewPortLeft;
    short ViewPortHeight;
    short ViewPortTop;
    float PulseRepetitionFrequency;
    int PixelSampleCount;
    float FlashDirectionVectorsX[FLASH_PIXEL_COUNT];
    float FlashDirectionVectorsY[FLASH_PIXEL_COUNT];
    float FlashDirectionVectorsZ[FLASH_PIXEL_COUNT];
    int FlashRowIndices[FLASH_PIXEL_COUNT];
    int FlashColumnIndices[FLASH_PIXEL_COUNT];
    int Checksum;
} SensorMessage;
// this structure holds the data from a LSF (Ladar Stream Format) Ladar Scan
Message
struct ScanMessageTag
{
    int SensorMessageIndex;
```

```
        int Reserved;
        int FlashCount;
        short ScanWidth;
        short ScanLeft;
        short ScanHeight;
        short ScanTop;
} ScanMessage;
// this structure holds the data from a LSF (Ladar Stream Format) Ladar Flash
Message
struct FlashMessageTag
{
        int ScanMessageIndex;
        long long Time;
        float PositionX;
        float PositionY;
        float PositionZ;
        float T11;
        float T12;
        float T13;
        float T21;
        float T22;
        float T23;
        float T31;
        float T32;
        float T33;
        int ScanRowIndex;
        int ScanColumnIndex;
        int FlashPixelCount;
        float SampleRate;
        float FirstSampleRange[FLASH_PIXEL_COUNT];
        float Samples[FLASH_PIXEL_COUNT * PIXEL_SAMPLE_COUNT];
        float Range[FLASH_PIXEL_COUNT];
        float Intensity[FLASH_PIXEL_COUNT];
} FlashMessage;
// this data structure holds the output result of the Efficient Processing
struct OutPutImagesTag
{
        float RangeImage[SCAN_HEIGHT][SCAN_WIDTH];
        float IntensityImage[SCAN_HEIGHT][SCAN_WIDTH];
        float XImage[SCAN_HEIGHT][SCAN_WIDTH];
        float YImage[SCAN_HEIGHT][SCAN_WIDTH];
        float ZImage[SCAN_HEIGHT][SCAN_WIDTH];
} OutputImages;
// holds the intermediate result of Efficient Processing part 1
float X[FLASH_PIXEL_COUNT];
float Y[FLASH_PIXEL_COUNT];
float Z[FLASH_PIXEL_COUNT];
// Retrieves data from a Ladar Format Stream and makes the
// Sensor, Scan and Flash Message data available for processing.
void GetSensorMessage( ){ /* To Be Determined */ };
void GetScanMessage( ){ /* To Be Determined */ };
void GetFlashMessage( ){ /* To Be Determined */ };
// sends output for further processing
void SendOutputImagesForFutherProcessing( ){ /* To Be Determined */ };
void ProcessLadarData( )
{
        GetSensorMessage( );
        for (int scanIndex = 0; scanIndex < SCAN_COUNT;
        scanIndex++)
        {
                GetScanMessage( );
                for (int flashIndex = 0; flashIndex <
                ScanMessage.FlashCount; flashIndex++)
                {
                        GetFlashMessage( );
                        for (int pixelIndex = 0; pixelIndex <
                        FlashMessage.FlashPixelCount; pixelIndex++)
                        {
                                // Efficient Processing, part 1,
                                computation of xyz points
                                X[pixelIndex] =
                                FlashMessage.Range[pixelIndex] *
                                                (
                                                    FlashMessage.T11 *
SensorMessage.FlashDirectionVectorsX[pixelIndex] + FlashMessage.T12 *
SensorMessage.FlashDirectionVectorsY[pixelIndex] +
                                                    FlashMessage.T13 *
```

```
                         -continued
SensorMessage.FlashDirectionVectorsZ[pixelIndex]
                         )
                         +
FlashMessage.PositionX;
            Y[pixelIndex] = FlashMessage.Range[pixelIndex] *
                         (
                         FlashMessage.T21 *
SensorMessage.FlashDirectionVectorsX[pixelIndex] +
FlashMessage.T22 * SensorMessage.FlashDirectionVectorsY[pixelIndex] +
FlashMessage.T23 * SensorMessage.FlashDirectionVectorsZ[pixelIndex]
                         )
                         +
FlashMessage.PositionY;
            Z[pixelIndex] = FlashMessage.Range[pixelIndex] *
                         (
                         FlashMessage.T31 *
SensorMessage.FlashDirectionVectorsX[pixelIndex] +
FlashMessage.T32 * SensorMessage.FlashDirectionVectorsY[pixelIndex] +
FlashMessage.T33 * SensorMessage.FlashDirectionVectorsZ[pixelIndex]
                         )
                         +
FlashMessage.PositionZ;
                         // Efficient Processing, part 2, flash to image
mapping
                         int row = SensorMessage.FlashRowIndices[pixelIndex] +
FlashMessage.ScanRowIndex;
                         int column =
SensorMessage.FlashColumnIndices[pixelIndex] + FlashMessage.ScanColumnIndex;
                         OutputImages.RangeImage[row][column] =
FlashMessage.Range[pixelIndex];
                         OutputImages.IntensityImage[row][column] =
FlashMessage.Intensity[pixelIndex];
                         OutputImages.XImage[row][column] = X[pixelIndex];
                         OutputImages.YImage[row][column] = Y[pixelIndex];
                         OutputImages.ZImage[row][column] = Z[pixelIndex];
                    }
               }
          SendOutputImagesForFurtherProcessing( );
     }
}
int main(int argc, char* argv[ ])
{
     ProcessLadarData( );
     return 0;
}
```

What is claimed is:

1. A method for processing a Ladar data stream comprising the steps of:
   (a) scanning a target to obtain pixel data from said target which identifies characteristics of a plurality points on a surface for said target, wherein a Ladar sensor is used to scan said target to obtain said pixel data including said characteristics of said target which include range and intensity data for a scan of said target;
   (b) generating a plurality of Ladar Sensor messages in a Ladar Sensor Format which include said pixel data, wherein said Ladar sensor generates said plurality of Ladar Sensor messages;
   (c) transmitting said plurality of Ladar Sensor messages from said Ladar sensor to a digital processor;
   (d) processing each of said Ladar Sensor messages including said pixel data to calculate X, Y, and Z coordinates for a three dimensional position for each of said plurality of pixel points on the surface of said target scanned by said Ladar sensor, wherein said digital processor processes each of said Ladar Sensor messages;
   (e) processing each of said X, Y, and Z coordinates for each of said plurality of pixel points, and said range and intensity data to a scan image array having five image planes for said X, Y, and Z coordinates and said range and intensity data for each of said plurality of pixel points on the surface of said target; and
   (f) constructing each of said Ladar Sensor messages provided by said Ladar sensor to have an informational hierarchy which consist of a plurality of Ladar Scan messages and a plurality of Ladar Flash messages within each of said Ladar Scan Messages wherein one of said Ladar Scan messages is generated for each scan of said target by said Ladar sensor.

2. The method of claim 1 wherein the step of processing each of said X, Y, and Z coordinates and said range and intensity data to said scan image array maps said X, Y, and Z coordinates and said range and intensity data to said scan image array, said scan image array comprising at least two fields which define a rectangular image region for said pixel data from each scan of said target, said at least two fields of said scan image array including a scan width field and a scan height field.

3. The method of claim 1 wherein each of said Ladar Flash Messages includes said pixel data for one scan of said plurality scans of said target, wherein said pixel data includes said range and intensity data and X, Y and Z position data for said Ladar sensor which is used in determining said X, Y, and Z coordinates for one of said plurality of pixel points.

4. The method of claim 1 wherein each of said Ladar Scan Messages include:
   (a) a sensor message index which points to an associated one of said Ladar Sensor messages wherein said Ladar Scan message is indexed to said associated one of said Ladar Sensor messages;
   (b) a flash count which is a total number of said Ladar Flash messages in a current scan of said target; and
   (c) four fields which represent a rectangular image region for said pixel data within said Ladar Flash messages for the current scan of said target.

5. The method of claim 1 wherein each of said Ladar sensor messages include a Flash direction vector X, a Flash direction vector Y and a Flash direction vector Z which are generated for each of a plurality of laser beams used for scanning said target, wherein said digital signal processor calculates said X, Y, and Z coordinates for each of said plurality of pixel points on the surface of said target from said Flash direction vector X, said Flash direction vector Y and said Flash direction vector Z.

6. The method of claim 5 wherein each of said Ladar sensor messages include Flash row indices and Flash column indices wherein said Flash row indices and said Flash column indices comprise an array for mapping each of said laser beams to a row and a column within one of said Ladar Flash messages.

7. The method of claim 1 wherein each of said Ladar Sensor messages, said Ladar Scan messages and said Ladar Flash messages includes:
   (a) a header wherein said header includes a message identification identifying one of a plurality of message types;
   (b) an index which is a sequential index number starting at zero for each of said message types, wherein said index increments by one with each subsequent message which is a same type of message; and
   (c) a word count which indicates a number for the words remaining in a message following a header block for said message.

8. The method of claim 7 wherein said each of said Ladar Sensor messages, said Ladar Scan messages and said Ladar Flash messages include a checksum located at an end of said message, said checksum being used to check for data corruption within said message.

9. A method for processing a Ladar data stream comprising the steps of:
   (a) scanning a target to obtain pixel data from said target which identifies characteristics of a plurality points on a surface for said target, wherein a Ladar sensor is used to scan said target to obtain said pixel data including said characteristics of said target which include range and intensity data for a scan of said target;
   (b) providing at least one laser beam directed at said target, wherein said at least one laser beam when directed at said target creates said pixel data which said Ladar sensor obtains upon scanning said target, said at least one laser beam being provided by a Ladar transmitter;
   (b) generating a plurality of Ladar Sensor messages in a Ladar Sensor Format which include said pixel data, wherein said Ladar sensor generates said plurality of Ladar Sensor messages;
   (c) transmitting said plurality of Ladar Sensor messages from said Ladar sensor to a digital processor;
   (d) processing each of said Ladar Sensor messages including said pixel data to calculate X, Y, and Z coordinates for a three dimensional position for each of said plurality of pixel points on the surface of said target scanned by said Ladar sensor, wherein said digital processor processes each of said Ladar Sensor messages in accordance with the following equation:

$$\begin{bmatrix} X \\ Y \\ Z \end{bmatrix} = \begin{bmatrix} T11 & T12 & T13 \\ T21 & T22 & T23 \\ T31 & T32 & T33 \end{bmatrix} \times \begin{bmatrix} x \\ y \\ z \end{bmatrix} \times \text{Range} + \begin{bmatrix} PositionX \\ PositionY \\ PositionZ \end{bmatrix} \quad (1)$$

where X,Y,Z are coordinates for each of said pixel points on the surface of said target as measured by said Ladar sensor; the matrix which contains elements T11, T12, T13, T21, T22, T23, T31, T32 and T33, is a three dimensional rotation matrix; the matrix containing vector elements x,y,z represents the x,y,z components of unit length direction vectors for each of said pixel points on the surface of said target; Range is measured by said Ladar sensor; and the matrix containing elements PositionX, PositionY, PositionZ defines a location for said Ladar sensor; and
   (e) processing each of said X, Y, and Z coordinates for each of said plurality of pixel points, and said range and intensity data to a scan image array having five image planes for said X, Y, and Z coordinates and said range and intensity data for each of said plurality of pixel points on the surface of said target.

10. The method of claim 9 wherein the step of processing each of said X, Y, and Z coordinates and said range and intensity data to said scan image array maps said X, Y, and Z coordinates and said range and intensity data to said scan image array, said scan image array comprising at least two fields which define a rectangular image region for said pixel data from each scan of said target, said at least two fields of said scan image array including a scan width field and a scan height field.

11. The method of claim 9 further comprising the step of constructing each of said Ladar Sensor messages provided by said Ladar sensor to have an informational hierarchy which consist of a plurality of Ladar Scan messages and a plurality of Ladar Flash messages within each of said Ladar Scan Messages wherein one of said Ladar Scan messages is generated for each scan of said target by said Ladar sensor.

12. The method of claim 11 wherein each of said Ladar Flash Messages includes said pixel data for one scan of said plurality scans of said target.

13. The method of claim 11 wherein each of said Ladar Scan Messages include:
   (a) a sensor message index which points to an associated one of said Ladar Sensor messages wherein said Ladar Scan message is indexed to said associated one of said Ladar Sensor messages;
   (b) a flash count which is a total number of said Ladar Flash messages in a current scan of said target; and
   (c) four fields which represent a rectangular image region for said pixel data within said Ladar Flash messages for the current scan of said target.

14. The method of claim 11 wherein each of said Ladar sensor messages include Flash row indices and Flash column indices wherein said Flash row indices and said Flash column indices comprise an array for mapping said at least one laser beam to a row and a column within one of said Ladar Flash messages.

15. The method of claim 11 wherein each of said Ladar Sensor messages, said Ladar Scan messages and said Ladar Flash messages includes:
   (a) a header wherein said header includes a message identification identifying one of a plurality of message types;

(b) an index which is a sequential index number starting at zero for each of said message types, wherein said index increments by one with each subsequent message which is a same type of message; and (c) a word count which indicates a number for the words remaining in a message following a header block for said message.

16. The method of claim 15 wherein said each of said Ladar Sensor messages, said Ladar Scan messages and said Ladar Flash messages include a checksum located at an end of said message, said checksum being used to check for data corruption within said message.

17. A method for processing a Ladar data stream comprising the steps of:

(a) scanning a target to obtain pixel data from said target which identifies characteristics of a plurality points on a surface for said target, wherein a Ladar sensor is used to scan said target to obtain said pixel data including said characteristics of said target which include range and intensity data for a scan of said target;

(b) providing a plurality of laser beams directed at said target, wherein said plurality of laser beams when directed at said target creates said pixel data which said Ladar sensor obtains upon scanning said target, said plurality of laser beams being provided by a Ladar transmitter;

(c) generating a plurality of Ladar Sensor messages in a Ladar Sensor Format which include said pixel data, wherein said Ladar sensor generates said plurality of Ladar Sensor messages, wherein each of said Ladar Sensor messages provided by said Ladar sensor has an informational hierarchy which consist of a plurality of Ladar Scan messages and a plurality of Ladar Flash messages within each of said Ladar Scan Messages wherein one of said Ladar Scan messages is generated for each scan of said target by said Ladar sensor;

(d) transmitting said plurality of Ladar Sensor messages from said Ladar sensor to a digital processor;

(e) processing each of said Ladar Sensor messages including said pixel data to calculate X, Y, and Z coordinates for a three dimensional position for each of said plurality of pixel points on the surface of said target scanned by said Ladar sensor, wherein said digital processor processes each of said Ladar Sensor messages in accordance with the following equation:

$$\begin{vmatrix} X \\ Y \\ Z \end{vmatrix} = \begin{vmatrix} T11 & T12 & T13 \\ T21 & T22 & T23 \\ T31 & T32 & T33 \end{vmatrix} \times \begin{vmatrix} x \\ y \\ z \end{vmatrix} \times \text{Range} + \begin{vmatrix} PositionX \\ PositionY \\ PositionZ \end{vmatrix} \quad (1)$$

where X,Y,Z are coordinates for each of said pixel points on the surface of said target as measured by said Ladar sensor; the matrix which contains elements T11, T12, T13, T21, T22, T23, T31, T32 and T33, is a three dimensional rotation matrix; the matrix containing vector elements x,y,z represents the x,y,z components of unit length direction vectors for each of said pixel points on the surface of said target; Range is measured by said Ladar sensor; and the matrix containing elements PositionX, PositionY, PositionZ defines a location for said Ladar sensor;

(f) processing each of said X, Y, and Z coordinates for each of said plurality of pixel points, and said range and intensity data to a scan image array having five image planes for said X, Y, and Z coordinates and said range and intensity data for each of said plurality of pixel points on the surface of said target, wherein processing each of said X, Y, and Z coordinates and said range and intensity data to said scan image array maps said X, Y, and Z coordinates and said range and intensity data to said scan image array, said scan image array comprising a plurality of fields which define a rectangular image region for said pixel data from each scan of said target, said plurality of fields of said scan image array including a scan width field and a scan height field; and (g) providing a header for each of said Ladar Sensor messages, said Ladar Scan messages and said Ladar Flash messages which includes a message identification identifying one of a plurality of message types, an index which is a sequential index number starting at zero for each of said message types, said index incrementing by one with each subsequent message which is a same type of message, and a word count which indicates a number for the words remaining in a particular message following a header block for said particular message.

18. The method of claim 17 wherein each of said Ladar Scan Messages include:

(a) a sensor message index which points to an associated one of said Ladar Sensor messages wherein said Ladar Scan message is indexed to said associated one of said Ladar Sensor messages;

(b) a flash count which is a total number of said Ladar Flash messages in a current scan of said target; and (c) four fields which represent a rectangular image region for said pixel data within said Ladar Flash messages for the current scan of said target.

19. The method of claim 17 wherein each of said Ladar Flash Messages includes said pixel data for one scan of said plurality scans of said target.

* * * * *